(12) United States Patent
Beers et al.

(10) Patent No.: US 10,155,290 B2
(45) Date of Patent: *Dec. 18, 2018

(54) WELD REPAIR FOR AN AIR CYCLE MACHINE COMPRESSOR HOUSING

(71) Applicant: Hamilton Sundstrand Corporation, Windsor Locks, CT (US)

(72) Inventors: Craig M. Beers, Wethersfield, CT (US); Clarence J. Wytas, Stafford Springs, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/995,753

(22) Filed: Jan. 14, 2016

(65) Prior Publication Data

US 2017/0204867 A1 Jul. 20, 2017

(51) Int. Cl.
| | | |
|---|---|---|
| *B23P 6/00* | (2006.01) | |
| *F01D 5/00* | (2006.01) | |
| *F04D 29/056* | (2006.01) | |
| *F16C 35/02* | (2006.01) | |
| *F16C 43/02* | (2006.01) | |
| *B64D 13/06* | (2006.01) | |

(52) U.S. Cl.
CPC ............. *B23P 6/00* (2013.01); *B23P 6/002* (2013.01); *F01D 5/005* (2013.01); *F04D 29/056* (2013.01); *F16C 35/02* (2013.01); *F16C 43/02* (2013.01); *B64D 2013/0648* (2013.01); *F05D 2230/232* (2013.01); *F05D 2230/80* (2013.01); *F05D 2240/14* (2013.01)

(58) Field of Classification Search
CPC .. F04D 29/4206; F04D 29/056; F04D 29/624; F04D 29/057; F04D 29/102; F04D 29/0513; F04D 29/5806; F04D 29/584; B64F 5/40; B64D 13/02; B64D 13/06; F05B 2230/10; F05B 2230/232; F05B 2230/70
See application file for complete search history.

(56) References Cited

U.S. PATENT DOCUMENTS

| | | | | |
|---|---|---|---|---|
| 4,480,475 | A * | 11/1984 | Tsao ..................... | B23K 9/0956 219/130.21 |
| 7,367,122 | B2 * | 5/2008 | Yip ......................... | B23P 6/002 277/415 |
| 7,402,020 | B2 | 7/2008 | Beers et al. | |
| 8,272,129 | B2 | 9/2012 | Kersteman | |

(Continued)

*Primary Examiner* — Logan Kraft
*Assistant Examiner* — Eric Zamora Alvarez
(74) *Attorney, Agent, or Firm* — Kinney & Lange, P.A.

(57) ABSTRACT

A method for repairing an air cycle machine compressor housing includes removing a journal bearing support sleeve in an air cycle machine compressor housing, positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve, welding the cylindrical insert to the air cycle machine compressor housing, and machining the welded cylindrical insert to form a replacement journal bearing support sleeve.

17 Claims, 10 Drawing Sheets

(56) References Cited

U.S. PATENT DOCUMENTS

| | | | | |
|---|---|---|---|---|
| 8,418,495 B2* | 4/2013 | Merritt | ............. | B64D 13/06 |
| | | | | 415/216.1 |
| 8,475,114 B2* | 7/2013 | Rosen | ............. | F16C 3/02 |
| | | | | 29/889.1 |
| 8,821,113 B2 | 9/2014 | Richardson et al. | | |
| 9,243,643 B2 | 1/2016 | Beers et al. | | |
| 2005/0061655 A1* | 3/2005 | Gros | ............. | C08G 18/792 |
| | | | | 204/157.6 |
| 2006/0000261 A1* | 1/2006 | Wardlaw, III | ......... | G01M 3/225 |
| | | | | 73/40.7 |
| 2012/0114463 A1* | 5/2012 | Beers | ............. | F04D 25/0606 |
| | | | | 415/151 |
| 2013/0078090 A1* | 3/2013 | Beers | ............. | F01D 25/16 |
| | | | | 415/230 |
| 2013/0298368 A1* | 11/2013 | Arellano | ............. | B23P 6/005 |
| | | | | 29/402.19 |
| 2014/0030070 A1* | 1/2014 | Beers | ............. | F04D 25/082 |
| | | | | 415/170.1 |
| 2014/0301830 A1 | 10/2014 | Beers et al. | | |
| 2016/0169056 A1* | 6/2016 | Luick | ............. | F01L 1/047 |
| | | | | 29/888.1 |
| 2017/0080530 A1* | 3/2017 | McGhee | ............. | B23P 6/005 |

* cited by examiner

WELD REPAIR FOR AN AIR CYCLE MACHINE COMPRESSOR HOUSING

BACKGROUND

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the initial ambient air temperature is very low. Thus, under most conditions, heat must be removed from air by the air cycle machine before the air is delivered to the aircraft cabin.

Air cycle machines typically include rotating parts connected to a rotating shaft that extends through static parts of the air cycle machine. Each end of the rotating shaft is supported with a journal bearing to mount the rotating shaft in the static parts of the air cycle machine. The journal bearings are supported by journal bearing support sleeves as part of a compressor housing. During assembly of the air cycle machine, the static parts need to be closely aligned with one another so that the journal bearings on either end of the air cycle machine can also be closely aligned. It is important to closely align the journal bearings so the rotating shaft rotates about an axis through the center of the rotating shaft. Any misalignment between the journal bearings can cause rubbing and wear between the rotating parts and the static parts. Motor failure, misalignment, or bearing failure can result in damage to the journal bearing support sleeve of the compressor housing. Replacing the compressor housing can be expensive.

SUMMARY

In one embodiment, a method for repairing an air cycle machine compressor housing includes removing a journal bearing support sleeve in an air cycle machine compressor housing, positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve, welding the cylindrical insert to the air cycle machine compressor housing, and machining the welded cylindrical insert to form a replacement journal bearing support sleeve.

In another embodiment, an air cycle machine compressor housing includes a compressor inlet volute wall extending radially inward and a journal bearing support sleeve welded to a radial innermost portion of the compressor inlet volute wall, wherein the journal bearing support sleeve was formed by machining an oversized cylindrical insert to final dimensions of the journal bearing support after the oversized cylindrical insert had been welded to the compressor inlet volute wall.

DETAILED DESCRIPTION

Figure 1A:
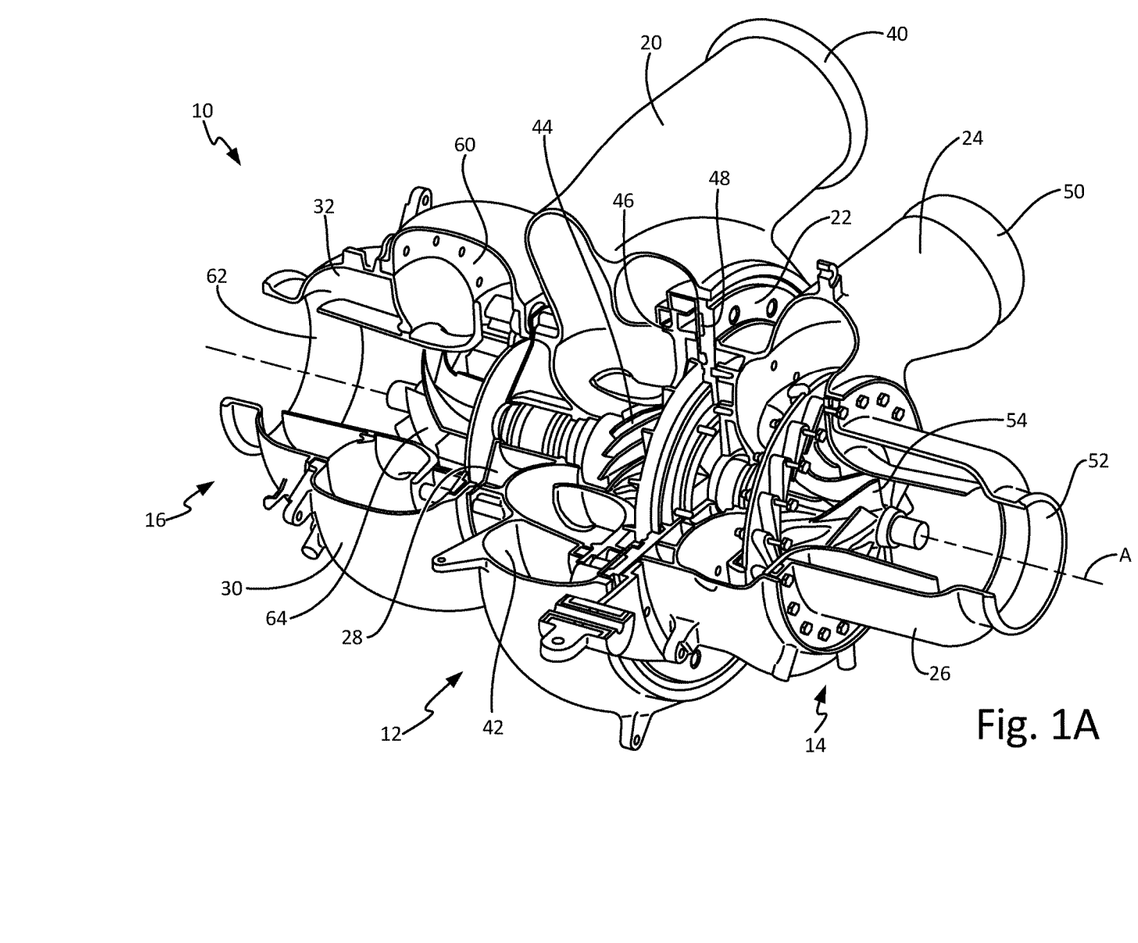
FIG. 1A is a partial cut-away perspective view of an air cycle machine.
Figure 1B:
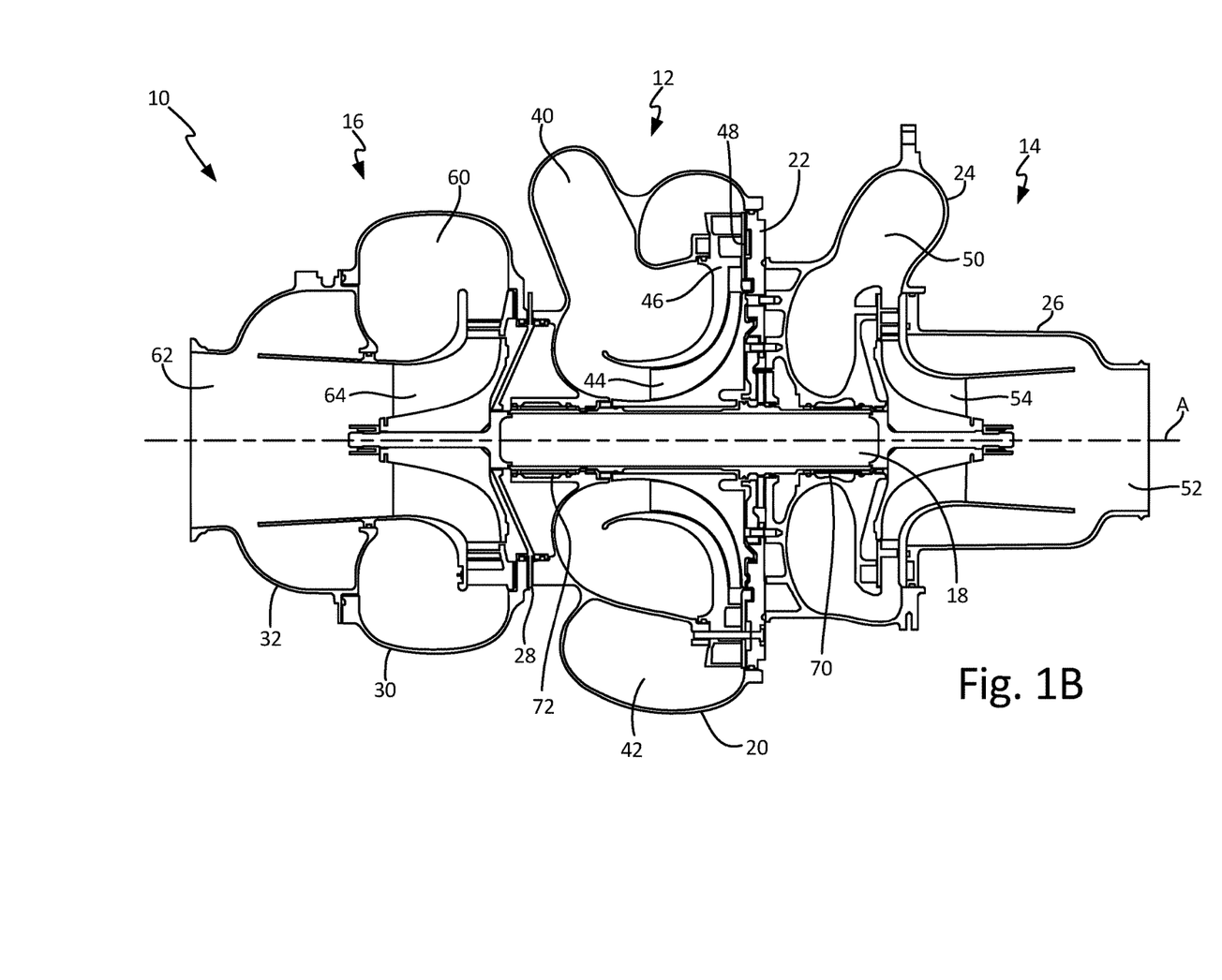
FIG. 1B is a cross-sectional view of the air cycle machine seen in FIG. 1A.

FIG. 1A is a partial cut-away perspective view of air cycle machine 10. FIG. 1B is a cross-sectional view of air cycle machine 10 seen in FIG. 1A. Air cycle machine 10 includes compressor section 12, first turbine section 14, second turbine section 16, shaft 18, compressor housing 20, first seal plate 22, first turbine inlet housing 24, first turbine outlet housing 26, second seal plate 28, second turbine inlet housing 30, and second turbine outlet housing 32. Also shown in FIGS. 1A-1B is axis A.

Compressor section 12, first turbine section 14, and second turbine section 16 are all mounted on shaft 18. Shaft 18 is rotatable about axis A. Compressor housing 20 forms a central housing portion of air cycle machine 10. Seal plate 22 is connected to a first end of compressor housing 20. First turbine inlet housing 24 is connected to seal plate 22 and first turbine outlet housing 26 is connected to first turbine inlet housing 24. Seal plate 28 is connected to a second end of compressor housing 20. Second turbine inlet housing 30 is connected to seal plate 28 and second turbine outlet housing 32 is connected to second turbine inlet housing 30. Compressor housing 20, first turbine inlet housing 24, first turbine outlet housing 26, second turbine inlet housing 30, and second turbine outlet housing 32 together form an overall housing for air cycle machine 10. Compressor housing 20 houses compressor section 12, first turbine inlet housing 24 and first turbine outlet housing 26 together house first turbine section 14, and second turbine inlet housing 30 and second turbine outlet housing 32 together house second turbine section 16.

Compressor section 12 includes compressor housing 20, which includes compressor inlet 40 and compressor outlet 42, and which houses compressor rotor 44, diffuser 46, and backing plate 48. Air is directed into compressor inlet 40 and is routed through a duct to compressor outlet 42. Compressor rotor 44 and diffuser 46 are positioned in the duct. Compressor rotor 44 is mounted to be rotatable with shaft 18 to compress the air flowing through compressor section 12. Diffuser 46 is a static structure through which the compressed air can flow after it has been compressed with compressor rotor 44. Diffuser 46 is positioned over and around compressor rotor 44. Backing plate 48 is positioned adjacent to vanes on diffuser 46 and contains the air moving through the vanes on diffuser 46. Air exiting diffuser 46 can exit compressor section 12 through compressor outlet 42.

First turbine section 14 includes first turbine inlet housing 24, first turbine outlet housing 26, first turbine inlet 50, first turbine outlet 52, and first turbine rotor 54. First turbine inlet housing 24 includes first turbine inlet 50 and first turbine outlet housing 26 includes first turbine outlet 52. First turbine rotor 54 extends between first turbine inlet housing 24 and first turbine outlet housing 26. Air is directed into first turbine inlet 50 and is routed through a duct formed between first turbine inlet housing 24 and first turbine outlet housing 26 to first turbine outlet 52. First turbine rotor 54 is positioned in first turbine section 14 and is mounted to be rotatable with shaft 18. First turbine rotor 54 will extract energy from the air passing through first turbine section 14 to drive rotation of shaft 18.

Second turbine section 16 includes second turbine inlet housing 30, second turbine outlet housing 32, second turbine inlet 60, second turbine outlet 62, and second turbine rotor 64. Second turbine inlet housing 30 includes second turbine inlet 60 and second turbine outlet housing 32 includes second turbine outlet 62. Second turbine rotor 64 extends between second turbine inlet housing 30 and second turbine outlet housing 32. Air is directed into second turbine inlet 60 and is routed through a duct formed between second turbine inlet housing 30 and second turbine outlet housing 32 to second turbine outlet 62. Second turbine rotor 64 is positioned in second turbine section 16 and is mounted to be rotatable with shaft 18. Second turbine rotor 64 will extract energy from the air passing through second turbine section 16 to drive rotation of shaft 18.

Air cycle machine 10 further includes first journal bearing 70 and second journal bearing 72. First journal bearing 70 is positioned around a first end of shaft 18 in first turbine inlet housing 24. Second journal bearing 72 is positioned around a second end of shaft 18 in compressor housing 20. First journal bearing 70 and second journal bearing 72 support shaft 18 as shaft 18 rotates in air cycle machine 10. When air cycle machine 10 is assembled, first journal bearing 70 and second journal bearing 72 are aligned so that shaft 18 is rotatable about axis A.

Figure 2:
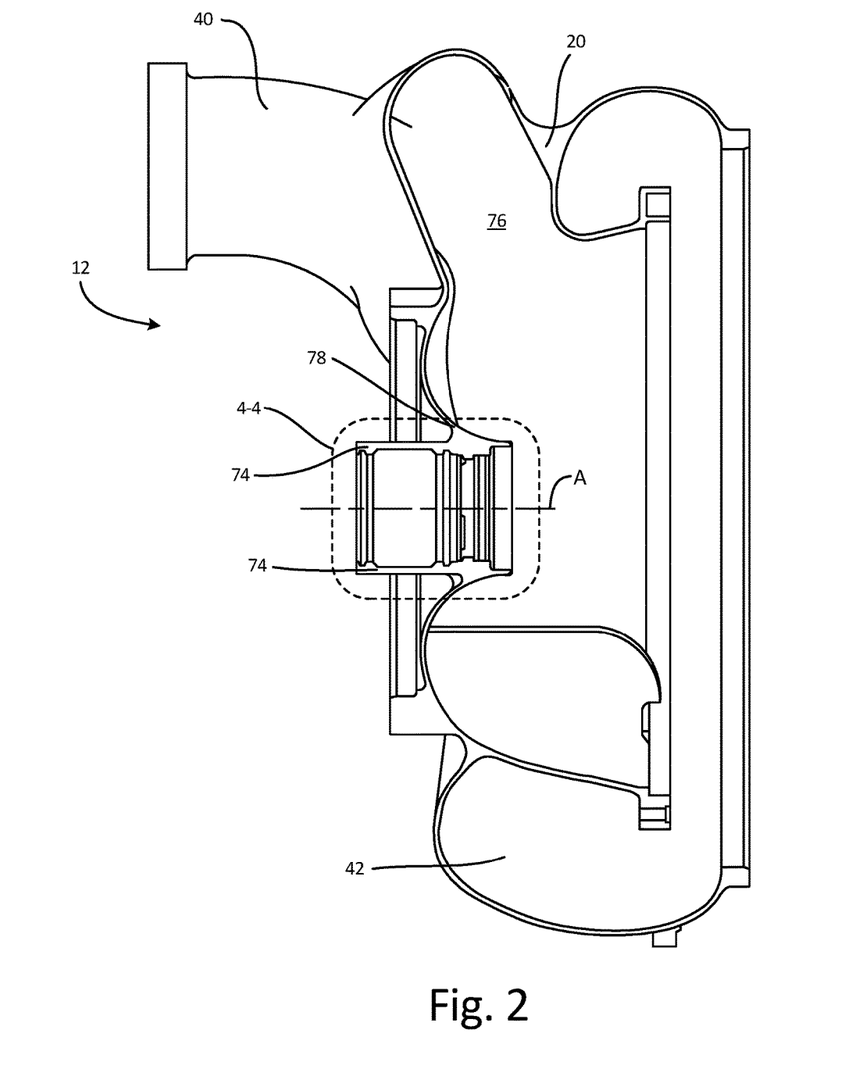
FIG. 2 is a cross-sectional view of a compressor section in the air cycle machine.

FIG. 2 is a cross-sectional view of compressor section 12 in air cycle machine 10. Compressor section 12 includes compressor housing 20, compressor inlet 40, compressor outlet 42, journal bearing support sleeve 74, compressor inlet volute 76, and inlet volute wall 78. Compressor section 12 is aligned on axis A. Compressor inlet 40 is positioned radially outward from axis A. The external boundaries of inlet volute 76 are defined by compressor housing 20. Inlet volute wall 78 is part of compressor housing 20 and extends radially outward from and connects to journal bearing support sleeve 74. Journal bearing support sleeve 74 is connected to second journal bearing 72. Journal bearing support sleeve 74 provides support to journal bearing 72. It is cost efficient to repair journal bearing support sleeve 74 rather than replace outlet compressor housing 20 in its entirety.

Figure 3:
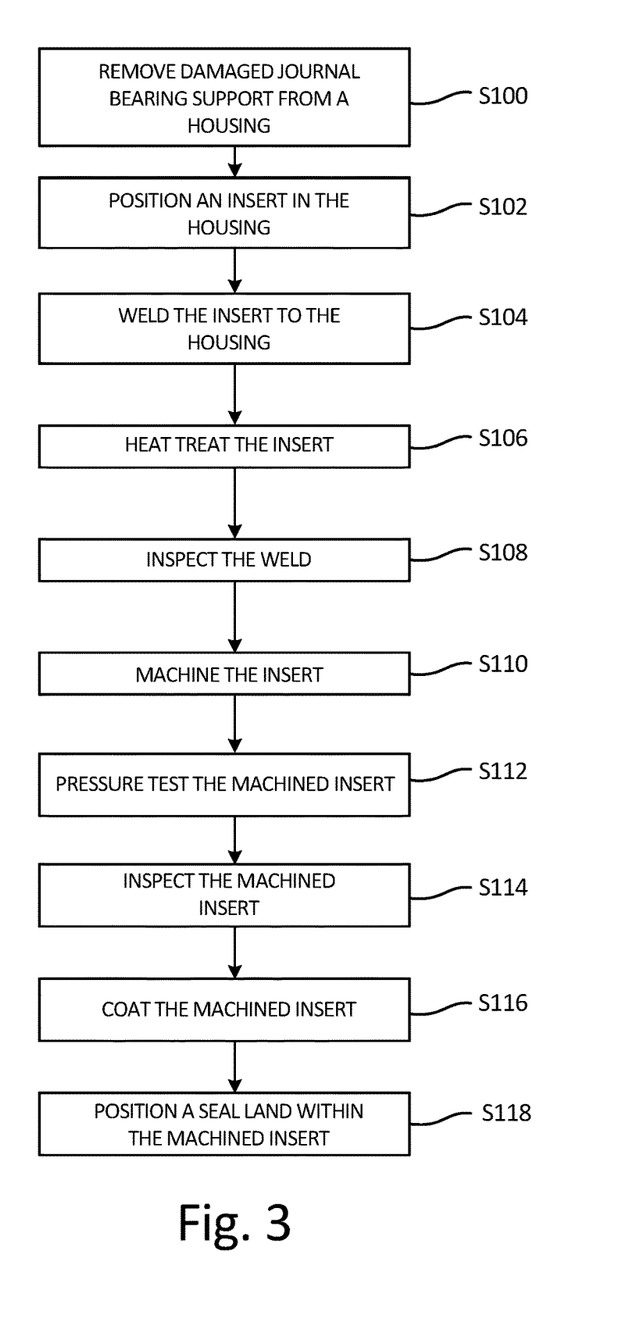
FIG. 3 is a flowchart illustrating of a method of repairing a compressor housing in the compressor section.
Figure 4:
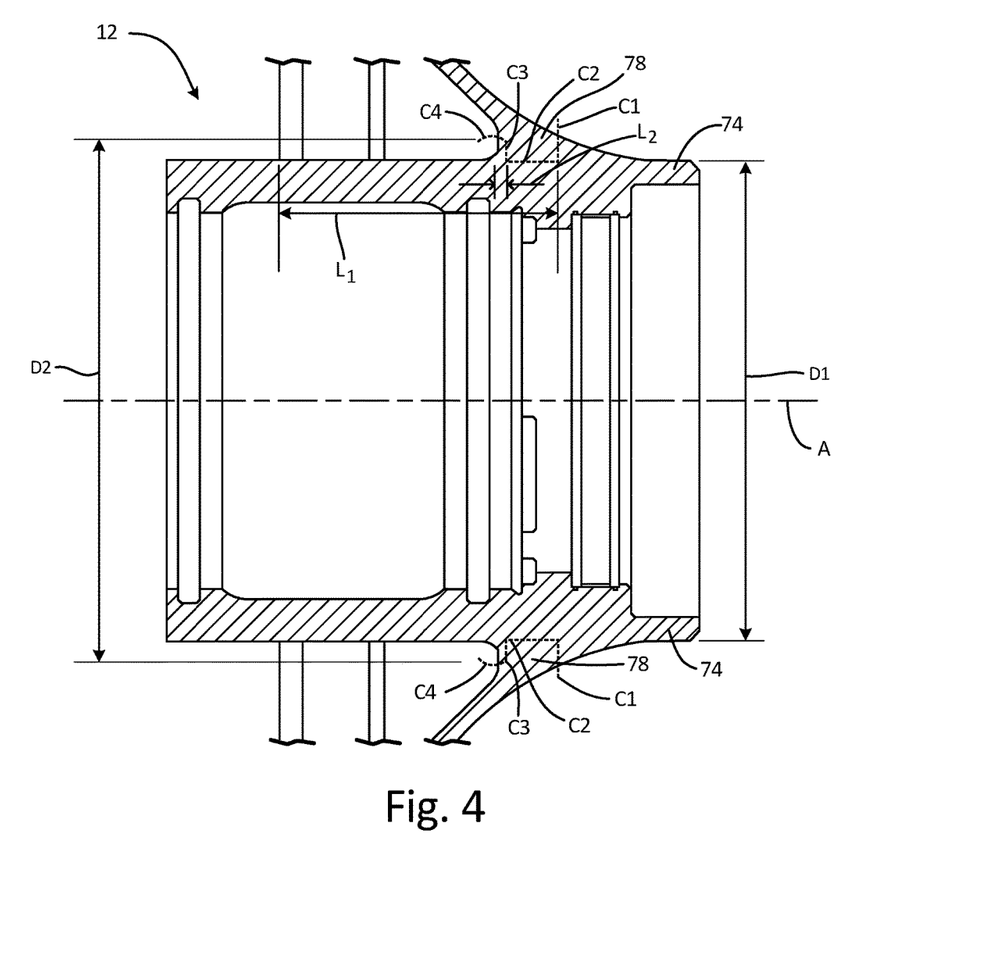
FIG. 4 is an enlarged cross-sectional view of a journal bearing support sleeve in the compressor housing indicated at the dashed line 4-4 of FIG. 2.
Figure 5:
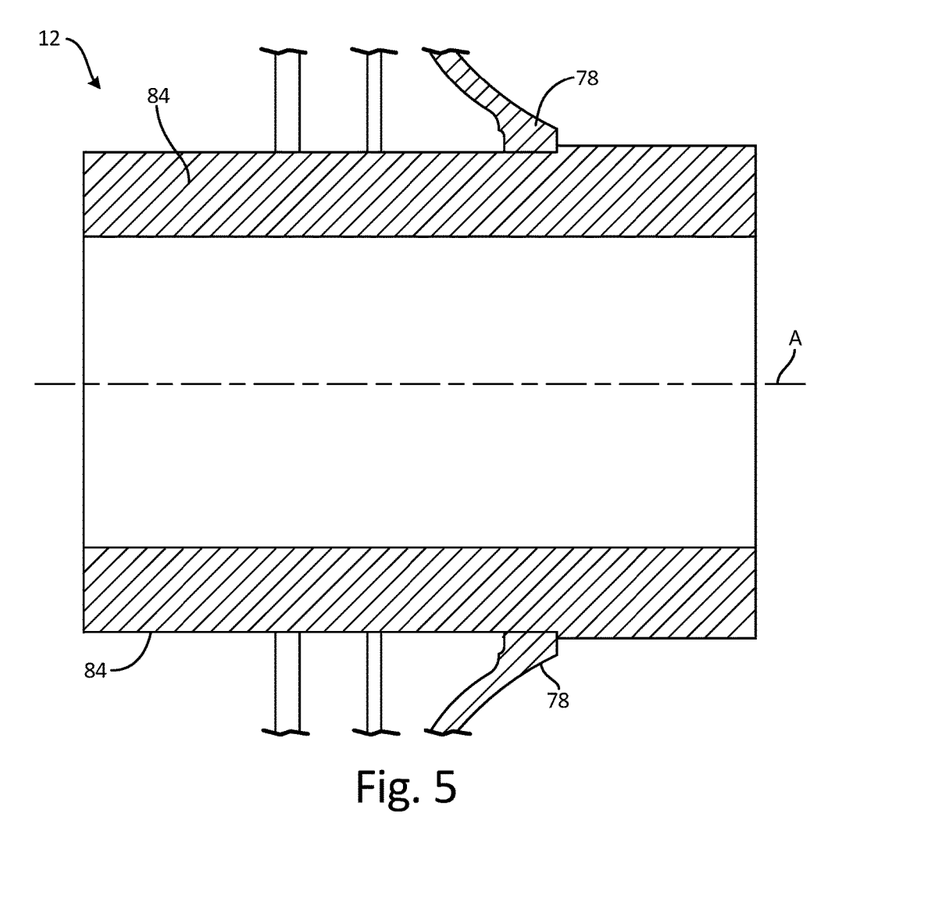
FIG. 5 is a cross-sectional view of a cylindrical insert positioned in the compressor housing.
Figure 6:
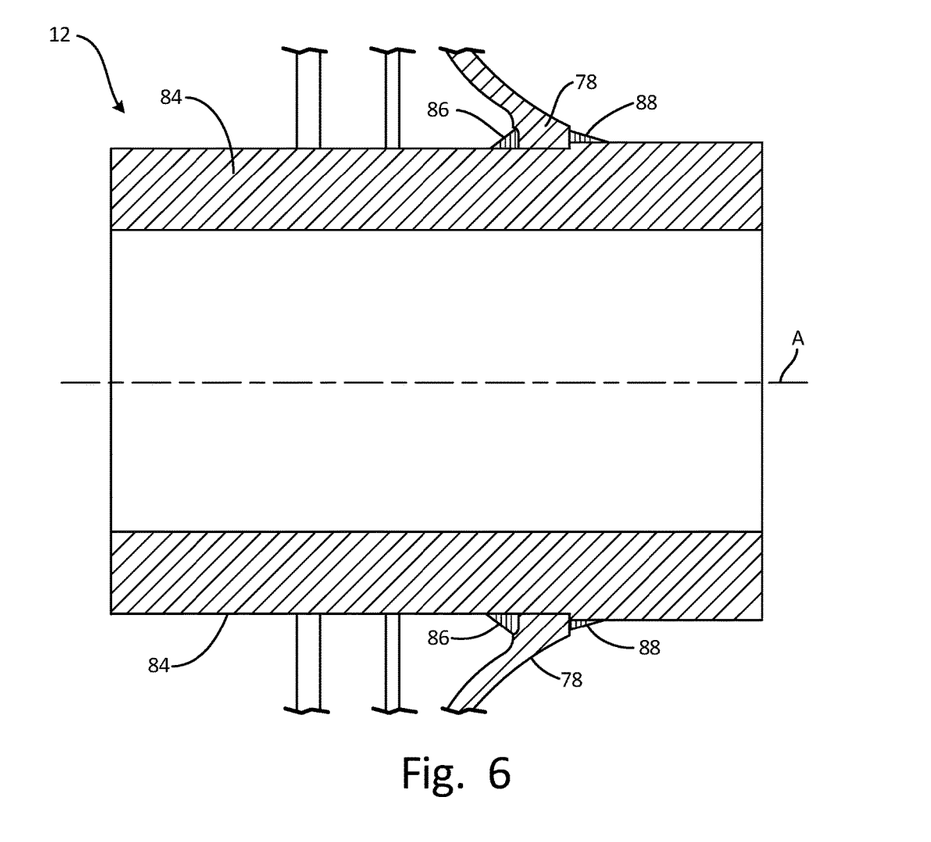
FIG. 6 is a cross-sectional view of the cylindrical insert welded to the compressor housing.
Figure 7:
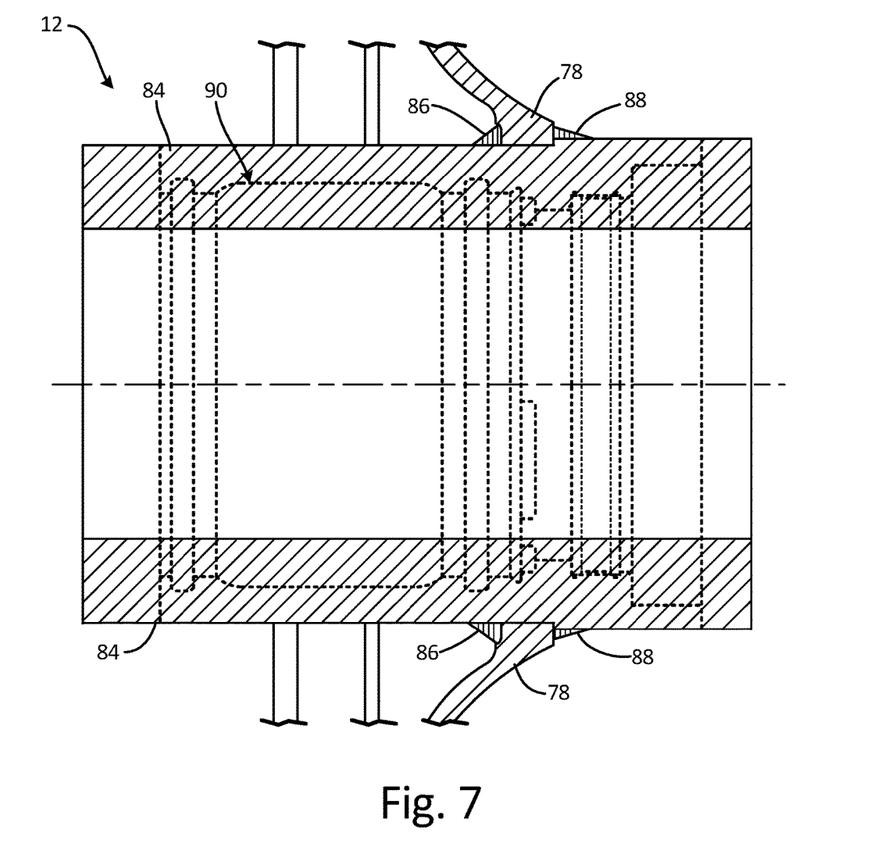
FIG. 7 is a cross-sectional view showing phantom lines on the cylindrical insert welded to the compressor housing
Figure 8:
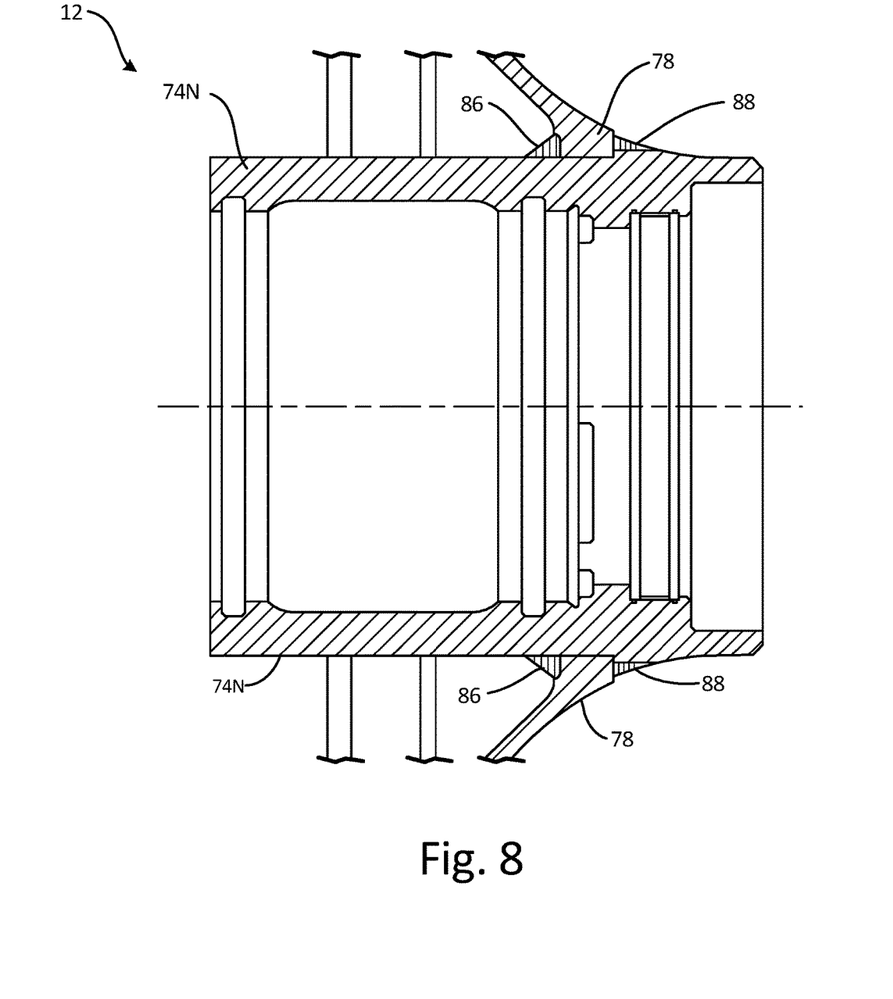
FIG. 8 is a cross-sectional view of the machined cylindrical insert in the compressor housing after the cylindrical insert has been machined to form a new journal bearing support sleeve welded to the compressor housing.
Figure 9:
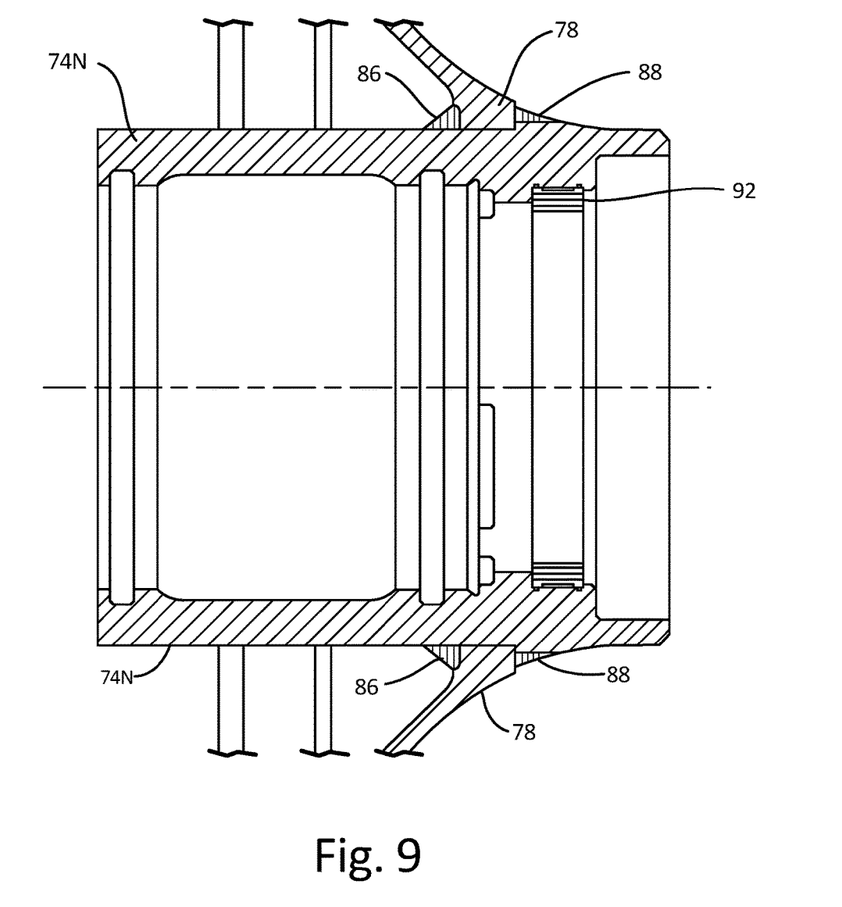
FIG. 9 is a cross-sectional view of a seal land positioned in the compressor housing.

FIG. 3 is a flowchart illustrating of a method of repairing compressor housing 20. FIG. 3 includes steps S100, S102, S104, S106, S108, S110, S112, S114, S116, and S118 to show how compressor housing 20 can be repaired at journal bearing support sleeve 74. FIGS. 4-9 illustrate some of the steps shown in the flow chart of FIG. 3. FIG. 4 is an enlarged cross-sectional view of a journal bearing support sleeve 74 in compressor housing 12 indicated at the dashed line 4-4 of FIG. 2. FIG. 5 is a cross-sectional view of cylindrical insert 84 positioned in compressor housing 20. FIG. 6 is a cross-sectional view of cylindrical insert 84 welded to compressor housing 20. FIG. 7 is a cross-sectional view showing phantom journal bearing support sleeve lines 90 on cylindrical insert 84 welded to compressor housing 20. FIG. 8 is a cross-sectional view of the machined cylindrical insert 84 in compressor housing 20 after the cylindrical insert has been machined to form new journal bearing support sleeve 74N welded to compressor housing 20. FIG. 9 is a cross-sectional view of seal land 92 in compressor housing 20.

Step S100 includes removing a damaged journal bearing support sleeve 74 from compressor housing 20, as seen in FIG. 4. At step S100, compressor section 12 includes journal bearing support sleeve 74 and inlet volute wall 78 of compressor housing 20. FIG. 4 also includes diameters $D_1$ and $D_2$; cuts $C_1$, $C_2$, and $C_3$; and lengths $L_1$ and $L_2$. In one embodiment, diameter $D_1$ is at or between 2.765 and 2.785 inches (70,231 and 70,739 micrometers) in length. Diameter $D_2$ is at or between 3.190 and 3.210 inches (68,326 and 68,834 micrometers) in length. Length $L_1$ is at or between 1.765 and 1.785 inches (44,831 and 45,339 micrometers). Length $L_2$ is 0.030 inches (762 micrometers). Cut $C_1$ is a circumferential cut about journal bearing support sleeve 74 at length $L_1$. Cut $C_2$ is a circumferential cut about journal bearing support sleeve 74 at diameter $D_1$. Cut $C_3$ is positioned so that the remaining cusp of inlet volute wall 78 has a max length of $L_2$. Cut $C_4$ is a circumferential cut about journal bearing support sleeve 74 at diameter $D_2$. Cuts $C_1$, $C_2$, $C_3$, and $C_4$ can be positioned so that inlet volute wall 78 has a minimum thickness of 0.80 inches (20,320 micrometers). Cuts $C_1$, $C_2$, $C_3$, and $C_4$ ensure that inlet volute wall 78 can support cylindrical insert 84 after removing journal bearing support sleeve 74.

In other embodiments, cuts may be performed in any order or can include a fewer or greater number of cuts to remove journal bearing support sleeve 74. In one embodiment, journal bearing support sleeve 74 can be removed from compressor housing 20 by milling. In another embodiment, journal bearing support sleeve 74 can be removed from compressor housing 20 by jig boring.

Step S102 includes positioning cylindrical insert 84 in inlet volute wall 78 of compressor housing 20 at the site where journal bearing support sleeve 74 was removed, as seen in FIG. 5. At step S102, compressor section 12 includes inlet volute wall 78 of compressor housing 20 and cylindrical insert 84. Cylindrical insert 84 is positioned so that it has a diametral interference at or between 0.001 and 0.003 inches (25.4 and 76.2 micrometers) with the inner diameter of inlet volute wall 78. Cylindrical insert 84 comprises a length and inner and outer diameter suitable for machining at step S114. Positioning cylindrical insert 84 ensures proper alignment for welding and machining steps S104 and S110, respectively. In one embodiment, cylindrical insert 84 can comprise aluminum or an aluminum alloy, such as Aerospace Specification Metals, Inc. (ASM) standard 6061-T6.

Step S104 includes welding oversized cylindrical insert 84 to compressor housing 20 at inlet volute wall 78, as seen in FIG. 6. At step S104, compressor section 12 includes inlet volute wall 78 of compressor housing 20, cylindrical insert 84, and fillet welds 86 and 88. Fillet welds are positioned at the joints where inlet volute wall 78 and cylindrical insert 84 meet. Fillet welds 86 and 88 extend circumferentially about cylindrical insert 84 on opposite sides of inlet volute wall 78. Welding cylindrical insert 84 to inlet volute wall 78 holds cylindrical insert 84 in proper alignment. In one embodiment, cylindrical insert 84 can be fusion welded, as in American Welding Standard specification D17. Suitable fillet welds can comprise aluminum or an aluminum alloy, such as SAE International aluminum standards AMS 4190 or AMS 4181 fillers. In another embodiment, cylindrical insert 84 can be electron beam welded to inlet volute wall 78. In other embodiments, any appropriate welding technique can be used.

Step S106 includes heat treating cylindrical insert 84. Heat treating relieves thermal stresses that can occur in cylindrical insert 84 from welding at step S104. In one embodiment, cylindrical insert 84 can be heat treated for 2 hours at a temperature at or between 300 and 320 degrees Fahrenheit (149 and 160 degrees Celsius) and then cooled.

Step S108 includes inspecting inlet volute wall 78, cylindrical insert 84, and fillet welds 86 and 88 for cracks or surface defects. In one embodiment, inlet volute wall 78, cylindrical insert 84, and fillet welds 86 and 88 are inspected using penetrant inspection. In other embodiments, any suitable weld inspection technique can be used.

Step S110 includes machining cylindrical insert 84, as seen in FIGS. 7 and 8. At step S110, compressor section 12 includes inlet volute wall 78, cylindrical insert 84, and fillet welds 86 and 88. FIG. 7 also includes phantom journal bearing support sleeve lines 90. Phantom journal bearing support sleeve lines 90 show where cylindrical insert 84 will be machined according to step S110. FIG. 8 is a cross-sectional view of the machined cylindrical insert 84 in compressor housing 20 after the cylindrical insert has been machined to form new journal bearing support sleeve 74N welded to inlet volute wall 78 of compressor housing 20. Cylindrical insert 84 connects with fillet welds 86 and 88 and inlet volute wall 78. Leaving fillet welds 86 and 88, cylindrical insert 84 can otherwise be machined to the dimensions of journal bearing support sleeve 74. Machining cylindrical insert 84 according to the dimensions of journal bearing support sleeve 74 forms new journal bearing support sleeve 74N. New journal bearing support sleeve 74N can support second journal bearing 72. Removing journal bearing support sleeve 74 and replacing it with new journal bearing support sleeve 74N is advantageous because it does not require removal of compressor housing 20 in its entirety. All machining to convert cylindrical insert 84 to new journal bearing support sleeve 74N has been performed with cylindrical insert 84 fixed to compressor housing 20 at inlet volute wall 78. As a result, alignment of the machined surfaces of new journal bearing support sleeve 74N with the other structural components of compressor section 12 can be assured. When compressor section 12 is reinstalled, new journal bearing support sleeve 74N can be aligned with axis A.

Step S112 includes pressure testing the welds of new journal bearing support sleeve 74N to compressor housing 20 at inlet volute wall 78. Pressure testing can detect defects or porosities that may be undetected in other types of testing. In one embodiment, compressor housing 20 can be tested by pressurizing it to fifty percent of the max operating pressure in service. In another embodiment, compressor housing 20 is pressurized to double the max operating pressure in service.

Step S114 includes inspecting support sleeve 74N for cracks or surface defects. Inspecting new journal bearing support sleeve 74N after machining at step S110 can reveal cracks or defects that were not on the surface prior to machining at step S100. In one embodiment, penetrant inspection can be used.

Step S116 includes coating new journal bearing support sleeve 74N. At step S116, new journal bearing support sleeve 74N is subject to a conversion coat to protect the aluminum or aluminum alloy from corrosion. The conversion coat provides new journal bearing support sleeve 74N with a pre-oxidized layer for corrosion protection. In one embodiment, the pre-oxidized layer can have a layer depth of approximately 0.1 inches (2,540 micrometers).

Step S118 includes inspecting and replacing seal land 92, if necessary, as shown in FIG. 9. At step S118, compressor housing 20 includes inlet volute wall 78, new journal bearing support sleeve 74N, fillet welds 86 and 88, and seal land 92. Seal land 92 is positioned within new journal bearing support sleeve 74N. Seal land 92 can comprise a polyimide-based polymer, such as Vespel®.

DISCUSSION OF POSSIBLE EMBODIMENTS

The following are non-exclusive descriptions of possible embodiments of the present invention.

A method for repairing an air cycle machine compressor housing according to an exemplary embodiment of this disclosure, among other possible things includes removing a journal bearing support sleeve in an air cycle machine compressor housing, positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve, welding the cylindrical insert to the air cycle machine compressor housing; and machining the welded cylindrical insert to form a replacement journal bearing support sleeve.

The method for repairing air cycle machine compressor housing of the preceding paragraph can optionally include, additionally and/or alternatively, any one or more of the following features, configurations and/or additional components:

The method wherein the welded cylindrical insert includes machining at least one portion of the outer surface of the welded cylindrical insert.

The method wherein machining the welded cylindrical insert includes machining at least one portion of the inner surface of the welded cylindrical insert.

The method wherein machining the welded cylindrical insert includes machining at least one of the end surfaces of the welded cylindrical insert.

The method further comprises positioning a seal land within the air cycle machine compressor housing.

The method further comprises heat treating the welded cylindrical insert prior to machining the welded cylindrical insert.

The method further comprises inspecting the weld for defects prior to machining the welded cylindrical insert.

The method further comprises inspecting the replacement journal bearing support sleeve for defects prior to positioning the seal land.

The method further comprises coating the replacement journal bearing support sleeve prior to positioning the seal land.

The method further comprises pressure testing the replacement journal bearing support sleeve prior to positioning the seal land.

An air cycle machine compressor housing according to an exemplary embodiment of this disclosure, among other possible things includes a compressor inlet volute wall extending radially inward; and a journal bearing support sleeve welded to a radial innermost portion of the compressor inlet volute wall, wherein the journal bearing support sleeve was formed by machining an oversized cylindrical insert to final dimensions of the journal bearing support after the oversized cylindrical insert had been welded to the compressor inlet volute wall.

The air cycle machine compressor housing of the preceding paragraph can optionally include, additionally and/or alternatively, any one or more of the following features, configurations and/or additional components:

The air cycle machine compressor housing wherein machining the oversized cylindrical insert includes machining at least one portion of an outer surface of the oversized cylindrical insert.

The air cycle machine compressor housing wherein machining the oversized cylindrical insert includes machining at least one portion of an inner surface of the oversized cylindrical insert.

The air cycle machine compressor housing wherein machining the oversized cylindrical insert includes machining end surfaces of the oversized cylindrical insert.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for repairing an air cycle machine compressor housing comprising:
    removing a journal bearing support sleeve in an air cycle machine compressor housing;
    positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve;
    welding the cylindrical insert to the air cycle machine compressor housing;
    heat treating the welded cylindrical insert;
    machining the welded cylindrical insert, after the cylindrical insert has been welded and heat treated, to form a replacement journal bearing support sleeve with machined surfaces that are aligned with the air cycle machine compressor housing, wherein machining the welded cylindrical insert comprises:
        machining at least one portion of an outer surface of the welded cylindrical insert;
        machining at least one portion of an inner surface of the welded cylindrical insert; and
        machining at least one end surface of the welded cylindrical insert; and
    positioning a seal land within the air cycle machine compressor housing.

2. The method of claim 1, further comprising inspecting a weld for defects prior to machining the welded cylindrical insert.

3. The method of claim 1, further comprising inspecting the replacement journal bearing support sleeve for defects prior to positioning the seal land.

4. The method of claim 1, further comprising coating the replacement journal bearing support sleeve prior to positioning the seal land.

5. The method of claim 1, further comprising pressure testing the replacement journal bearing support sleeve prior to positioning the seal land.

6. The method of claim 1, wherein the air cycle machine compressor housing comprises:
    a compressor inlet volute wall extending radially inward and wherein the journal bearing support sleeve is welded to a radial innermost portion of the compressor inlet volute wall, wherein the journal bearing support sleeve was formed by machining the cylindrical insert to final dimensions of the journal bearing support sleeve after the cylindrical insert had been welded to the compressor inlet volute wall.

7. The method of claim 6, wherein machining the cylindrical insert includes machining at least one portion of an outer surface of the cylindrical insert.

8. The method of claim 6, wherein machining the cylindrical insert includes machining at least one portion of an inner surface of the cylindrical insert.

9. The method of claim 6, wherein machining the cylindrical insert includes machining end surfaces of the cylindrical insert.

10. A method for repairing an air cycle machine compressor housing comprising:
    removing a journal bearing support sleeve in an air cycle machine compressor housing;
    positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve;
    welding the cylindrical insert to the air cycle machine compressor housing;
    machining the welded cylindrical insert, after the cylindrical insert has been welded, to form a replacement journal bearing support sleeve with machined surfaces that are aligned with the air cycle machine compressor housing, wherein machining the welded cylindrical insert comprises:
        machining at least one portion of an outer surface of the welded cylindrical insert;
        machining at least one portion of an inner surface of the welded cylindrical insert; and
        machining at least one end surface of the welded cylindrical insert; and
    inspecting the replacement journal bearing support sleeve for defects; and
    positioning a seal land within the air cycle machine compressor housing.

11. The method of claim 10, further comprising heat treating the welded cylindrical insert prior to machining the welded cylindrical insert.

12. The method of claim 10, further comprising inspecting the welded cylindrical insert for defects prior to machining the welded cylindrical insert.

13. The method of claim 10, further comprising coating the replacement journal bearing support sleeve prior to positioning the seal land.

14. The method of claim 10, further comprising pressure testing the replacement journal bearing support sleeve prior to positioning the seal land.

15. A method for repairing an air cycle machine compressor housing comprising:
- removing a journal bearing support sleeve in an air cycle machine compressor housing;
- positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve;
- welding the cylindrical insert to the air cycle machine compressor housing;
- machining the welded cylindrical insert, after the cylindrical insert has been welded, to form a replacement journal bearing support sleeve with machined surfaces that are aligned with the air cycle machine compressor housing, wherein machining the welded cylindrical insert comprises:
  - machining at least one portion of an outer surface of the welded cylindrical insert;
  - machining at least one portion of an inner surface of the welded cylindrical insert; and
  - machining at least one end surface of the welded cylindrical insert; and
- pressure testing the replacement journal bearing support sleeve; and
- positioning a seal land within the air cycle machine compressor housing.

16. The method of claim 15, further comprising coating the replacement journal bearing support sleeve prior to positioning the seal land.

17. A method for repairing an air cycle machine compressor housing comprising:
- removing a journal bearing support sleeve in an air cycle machine compressor housing;
- positioning a cylindrical insert within the air cycle machine compressor housing, wherein the cylindrical insert has an outer diameter greater than an outer diameter of at least one portion of the removed journal bearing support sleeve, an inner diameter less than an inner diameter of at least one portion of the removed journal bearing support sleeve, and a length greater than a length of the removed journal bearing support sleeve;
- welding the cylindrical insert to the air cycle machine compressor housing; and
- machining the welded cylindrical insert, after the cylindrical insert has been welded, to form a replacement journal bearing support sleeve with machined surfaces that are aligned with the air cycle machine compressor housing, wherein machining the welded cylindrical insert comprises:
  - machining at least one portion of an outer surface of the welded cylindrical insert;
  - machining at least one portion of an inner surface of the welded cylindrical insert; and
  - machining at least one of end surfaces of the welded cylindrical insert.

* * * * *